United States Patent [19]

Lavine

[11] Patent Number: 4,523,099
[45] Date of Patent: Jun. 11, 1985

[54] DEVICE FOR TRANSMITTING ANALOG SENSOR DATA VIA FIBER OPTICS

[76] Inventor: Michael K. Lavine, 90 Hadley Village Rd., South Hadley, Mass. 01075

[21] Appl. No.: 489,769

[22] Filed: Apr. 29, 1983

[51] Int. Cl.³ .............................................. H04B 9/00
[52] U.S. Cl. ..................................... 250/551; 455/612
[58] Field of Search ............................... 250/227, 551; 455/608-613, 617-619; 350/96.16

[56] References Cited

U.S. PATENT DOCUMENTS

| | | | |
|---|---|---|---|
| 3,488,586 | 1/1970 | Watrous et al. | 455/612 X |
| 4,161,651 | 7/1979 | Sano et al. | 455/613 X |
| 4,211,929 | 7/1980 | Tamburelli | 250/551 |
| 4,215,269 | 7/1980 | Kuhn | 455/612 |
| 4,420,842 | 12/1983 | Kuhn | 455/618 X |

Primary Examiner—Edward P. Westin
Attorney, Agent, or Firm—Donald S. Holland

[57] ABSTRACT

A monitoring system is disclosed in which fiber-optic cables are used with sensors, e.g., a temperature sensor, to transmit analog data from the sensors in binary form to a receiver. The binary information is then analyzed by a microprocessor, which is attached to the receiver, to monitor the system. The purpose of the fiber-optic cables is to ensure the isolation of the transmitted data from surrounding electrical noise and natural phenomena. That noise tends to distort the transmittal of such sensor data in prior systems which use hard wires instead of fiber-optic cables. Unlike prior systems in which a fiber-optic light source known as an "L.E.D." (light-emitting diode) is normally kept "on", the main feature of this system is that its L.E.D. is normally kept "off" and is turned "on" only when information is desired. This greatly increases the life of the L.E.D., which is important when the system is used in remote places, such as satellites, where an electrician is not available to replace a burned-out diode.

7 Claims, 8 Drawing Figures

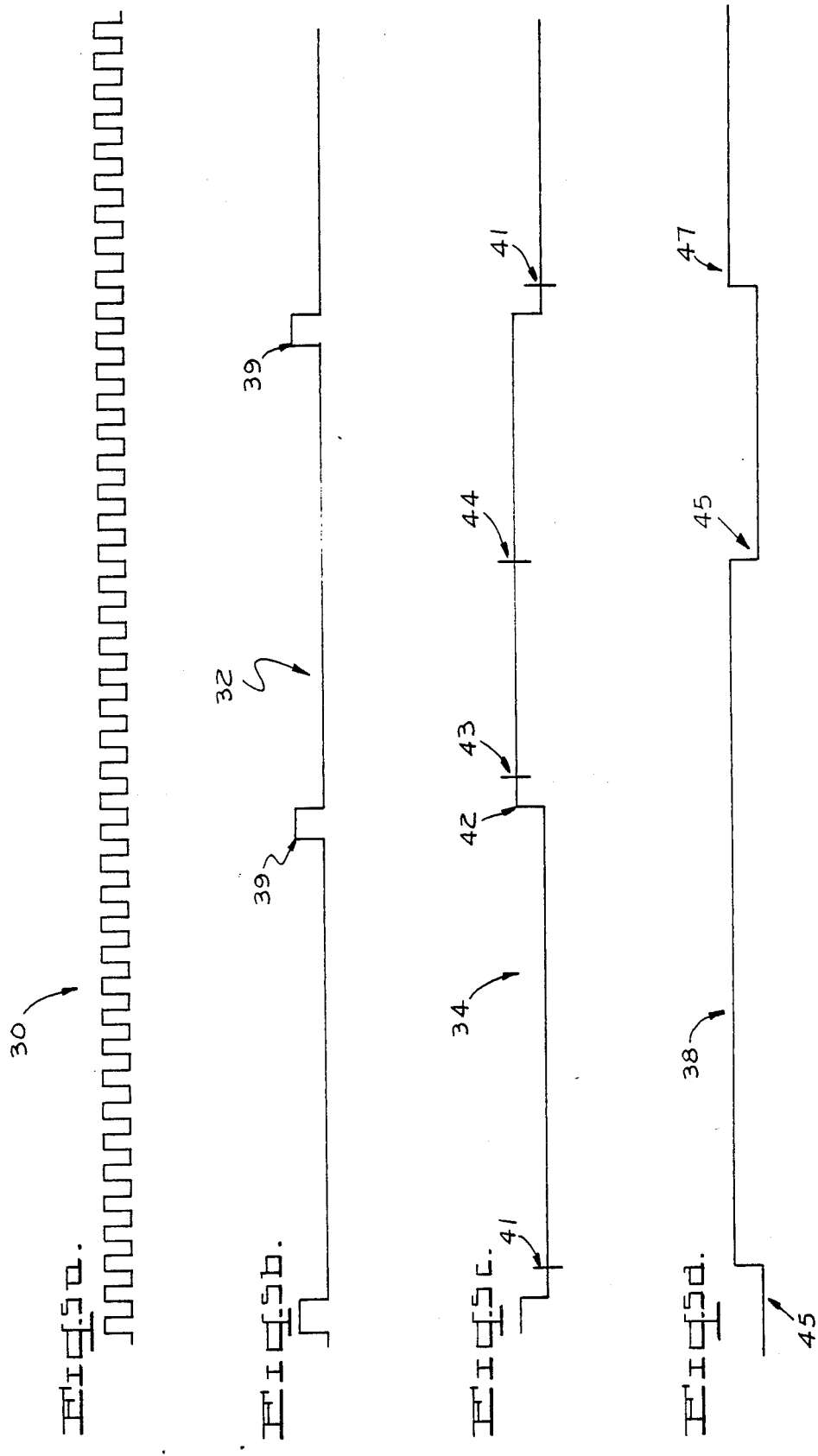

4,523,099

DEVICE FOR TRANSMITTING ANALOG SENSOR DATA VIA FIBER OPTICS

BACKGROUND OF THE INVENTION

This invention relates to monitoring systems that use electro-optical transmission lines to transmit sensor data to a central processor.

Electro-optical transmission systems are known in which electrical signals are coupled to a first electrical connector member where the signal is converted by means of a light-emitting diode (an "L.E.D.") to an electrical output signal, and the output signal is transmitted by a fiber-optic cable to a light-receiving diode in a second connector member which receives the optical signal and converts it back to an electrical signal. Such electro-optical transmission systems have the advantage over conventional hard-wire transmission systems in that they are not susceptible to electro-magnetic interference ("E.M.I.") and radio frequency interference ("R.F.I."). Since these systems are not subject to electrical noise, they are often used in high technology situations, such as monitoring systems in satellites, to precisely transmit electrical data.

Besides being relatively immune to electrical noise, another aspect which makes the fiber-optic cable attractive is the lighter weight of the cable as compared to a shielded link using conventional hard wire. Further, fiber-optic links also have a greater bandwidth, which enables more information to be transmitted if the information is multiplexed.

While these systems have proved quite useful, especially in satellites for transmitting information from a remote sensor with a high degree of accuracy, these systems have a serious drawback. Their L.E.D.s are usually kept "on" even when information is not desired. Thus, the L.E.D. of most prior systems quickly burns out. And, as soon as it does, the system is useless. The system can no longer transmit information until the L.E.D. is replaced.

While this may be only a minor setback in places where the diode can be easily replaced, it is fatal when the system is in a remote area, where repair is unfeasible. Consequently, a need exists for a system in which the life of the L.E.D. is prolonged.

SUMMARY OF THE INVENTION

An electro-optical device for transmitting analog data via fiber optics is disclosed. In the preferred embodiment, the device basically comprises a transmission circuit for receiving electrical analog data from a sensor, converting the data into a string of binary information and transforming the information into light pulses by an L.E.D. for subsequent transmittal via a fiber-optic cable to a receiver unit, where the information is converted back into an analog signal prior to sending it to a microprocessor in a monitoring system. The device includes a means for allowing the L.E.D. to be normally kept "off" when no information is desired by a user, and to be turned "on" only when a new string of monitoring information is desired. This means includes a self-resetting means for automatically clearing the receiver unit after the L.E.D. is turned "on" so that the string of sensor information transmitted by the receiver circuit to the monitor only includes the new information obtained by the device after the diode is turned "on" and does not include any stale information previously stored by the device.

The transmission circuit includes an analog-to-digital converter for receiving analog data and converting the data into binary information, a shift register connected to the converter for receiving a string of binary information and shifting the information to the L.E.D. where it is transformed into light pulses.

A fiber-optic cable is attached at one of its ends and is adapted to receive the light pulses and transmit them to the receiver circuit.

The receiver circuit is attached to the opposite end of the fiber-optic cable and includes a light-receiving diode for receiving the light pulses transmitted by the cable and converting them back into electrical data signals, a de-multiplexer connected to the light-receiving diode for handling the data and sending the data to an attached shift register, and a digital-to-analog converter attached to the shift register for receiving a string of data in binary form from the shift register, converting the data back to an analog signal and transmitting it to the monitoring system.

It is the primary object of the present invention to provide an electro-optical transmission system in which the life of the L.E.D. is conserved and the system's life is thereby prolonged.

It is a more specific object to provide an electro-optical transmission system for transmitting sensor data in spacecraft, wherein the L.E.D. is normally kept "off" when no information is desired by a user and is turned "on" only when information is desired. By keeping the L.E.D. "off" until information is desired, the L.E.D. will usually last a longer time before it burns out and, consequently, the usual life of the entire system will be prolonged.

It is another object to provide an electro-optical transmission system that is self-resetting so that when the system is turned "on", the only information that will be transmitted is the information desired by the user and not information previously stored by the device.

Other aspects and advantages of the invention will become more apparent from the following description taken in conjunction with the accompanying drawings.

BRIEF DESCRIPTION OF THE DRAWINGS

FIGS. 5A–5D collectively are a timing diagram for the transmission circuit, with FIG. 5A representing the clock pulses from a timer, FIG. 5B representing the output of a binary counter which counts the pulses, FIG. 5C representing the output of a flip flop which resets an analog-to-digital converter in response to the counter's output and instructs the converter when to start and stop the conversion of analog electrical signals into binary bits, and FIG. 5D representing an output line of the converter that governs the shifting of data into and out of a shift register.

DETAILED DESCRIPTION OF THE PREFERRED EMBODIMENT

Figure 1:
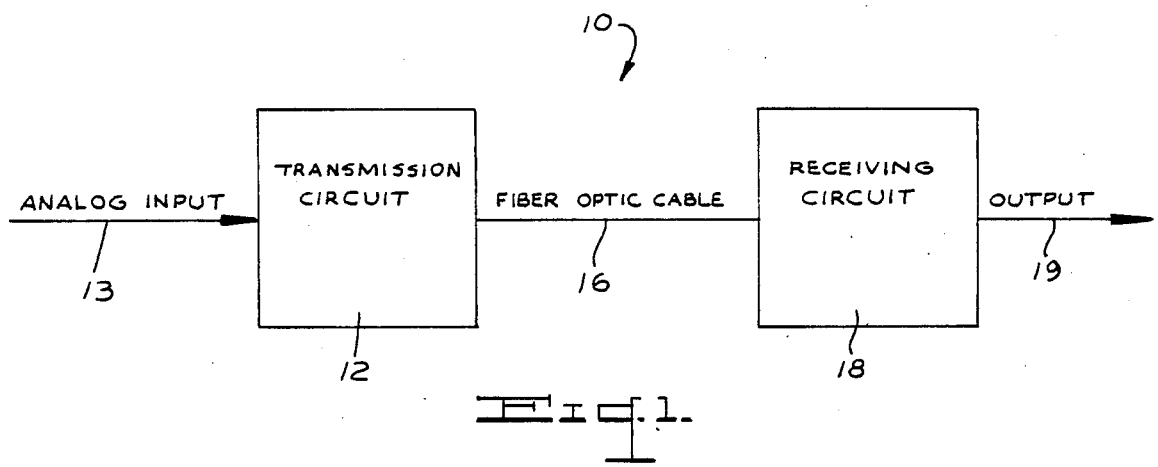
FIG. 1 is a system block diagram of the invention.

Referring to the drawings in detail, an electro-optical transmission link 10 is illustrated for transmitting analog data in a monitoring system (not shown) from remote sensors, e.g., a temperature sensor, in binary form to a microprocessor. As shown in FIG. 1, the link 10 includes a transmission circuit 12 for receiving an electrical analog signal 13 and converting it into an optical signal via a photoelectric cell 14 (an L.E.D.), and a fiber-optic cable 16 for transmitting the optical signal from the transmission circuit to a receiving circuit 18 where the optical signal is converted back to an electrical signal prior to sending it along output line 19 to the microprocessor.

When information is not desired, the L.E.D. is kept "off" and is turned "on" only when a new string of information is desired. To prevent the system from misinforming the user with stale information that was stored prior to the L.E.D. being shut "off" in a previous cycle, the receiver unit 18 includes a selfresetting circuitry for clearing the receiver unit after the L.E.D. is turned "on" so that the receiver is "empty" prior to it sending a first bit of new sensor data to the microprocessor.

THE TRANSMISSION CIRCUIT

Figure 2:
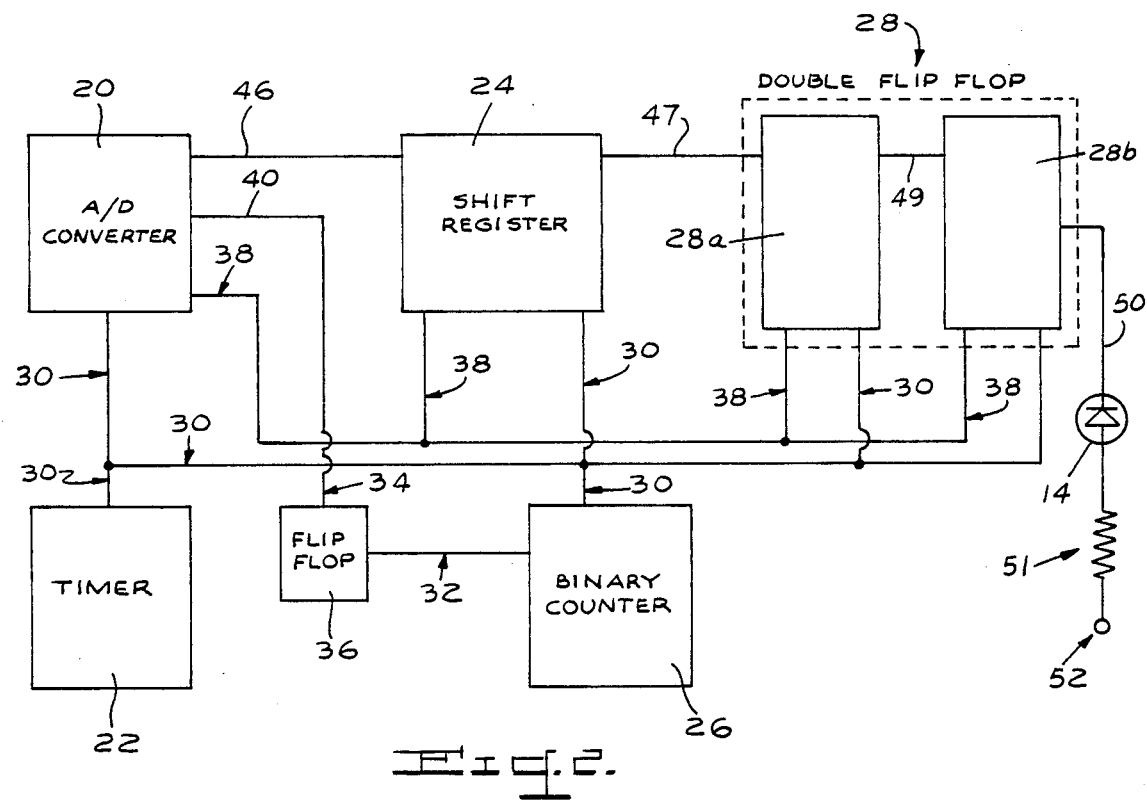
FIG. 2 is a block diagram of the transmission circuit shown in FIG. 1.

As shown in FIG. 2, the transmission circuit 12 includes an analog-to-digital converter 20 ("A/D" converter), here an MN5143 A/D converter by Micro Networks Corporation. This chip requires only eight clock cycles for the binary encoding of the analog data from the sensor.

Timing for the transmission circuit is accomplished by a standard 555 timing chip (numbered 22 in the drawings) which is set in the astable mode. The output of the timer 22 is set to have a "high" output for 2.2 msec. and a "low" output for 1.4 msec. for a total clock cycle of 3.6 msec. The frequency of the clock is set to be about 277 Hz. The timer 22 controls the A/D converter 20 along with a standard 74199 eight-bit shift register (numbered 24 in the drawings), a standard 74163 four-bit binary counter (numbered 26 in the drawings), and a standard 7474 dual D-type flip flop (numbered 28 in the drawings).

The timing diagram for the transmission circuit 12 is shown in FIGS. 5A–5D. The main lines shown represent the clock output 30, the counter output 32, an output 34 of a standard 7476 J-K flip flop 36 and an "end of convert" ("E.O.C.") output 38 from the A/D converter 20.

The timer 22 is designed to operate as an astable multivibrator. Its output is connected to the clock input pin of the counter 26 which counts the clock cycles. At counts of sixteen, the output line 32 of the counter goes "high" (represented by reference numeral 39 in FIG. 5B). This "high" serves to toggle or switch over the J-K flip flop 36 whose output 34 governs a "start convert" line 40 of the A/D converter 20. When the start convert line is brought "low", the A/D converter 20 goes into a reset mode (represented by reference numeral 41 in FIG. 5C), and upon returning to a "high" sixteen clock cycles later (at 42), the A/D converter 20 starts the conversion process (at 43) of transmitting an analog signal from the data and converting it into an optical signal.

The conversion process is completed in eight clock cycles (as at 44), and the E.O.C. line 38 is then brought "low" to signify that the conversion has been completed. The E.O.C. line governs the loading and shifting of the data into and out of the shift register 24. When the E.O.C. is "low" (as at 45 in FIG. 5D), the data is loaded into the register along data line 46 in FIG. 2, and when the E.O.C. is "high" (as at 47 in FIG. 5D), the data is shifted out of the register along data line 48 in FIG. 2.

The E.O.C. line 38 also controls the setting of a "sync bit" and the clearing of a "buffer". When the E.O.C. line goes "low", the first D flip flop 28a (of the double flip flop 28) is activated which produces a "high" output (the "sync bit") and clears the output of the second D flip flop 28b (the "buffer").

The buffer is needed due to the sync output being "high" for a period of time between the setting of the output and the time of the actual transmission. This "high" could be mistaken for the data by the receiver circuit 18. By using the buffer, the output will be "low" until the actual transmission of the data. When the flip flop 36 again toggles to the reset position at 41, the E.O.C. line 38 will go "high" to initiate the transmission of the data through the double flip flop 28 along line 49 to the data output line 50.

Referring again to FIG. 2, the transmission circuit's L.E.D. 14 is attached to the output line 50. In the preferred embodiment, the L.E.D. is a Radio Shack Infrared L.E.D., Model No. XC-880-A. It is connected to a 1000-ohm resistor 51 and a direct current biasing voltage of 5 volts, shown at number 52.

The L.E.D. receives strings of binary information from the line 50 in the form of electrical signals and transforms these signals into light pulses. The light pulses are then transmitted to an end (not shown) of the fiber-optic cable 16, and from there to the receiver circuit 18.

THE RECEIVER CIRCUIT

Figure 3:
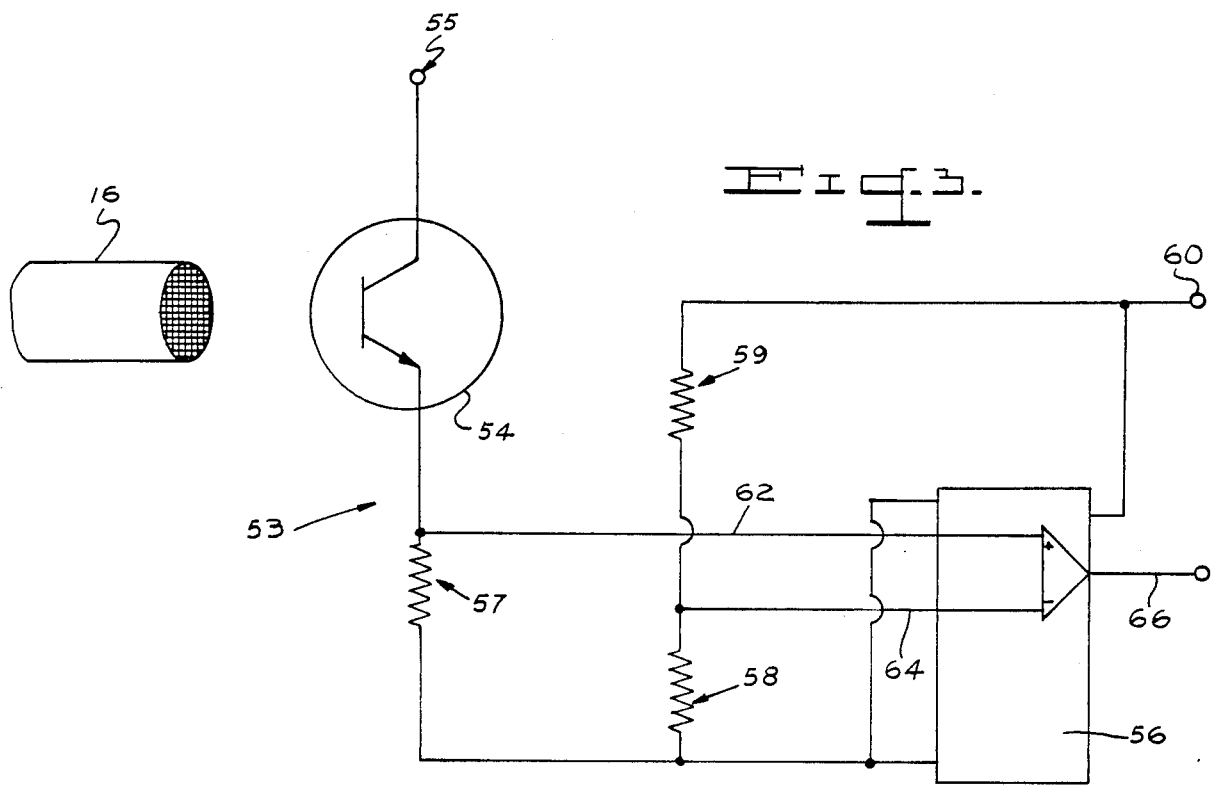
FIG. 3 is a schematic of an optical receiver used in the receiving circuit of FIG. 1.

The first step in the receiver circuit 18 is to acquire the information obtained between the fiber-optic cable 16 which interconnects the output of the L.E.D. 14 to the receiver circuit 18. This initial step is accomplished by the optical receiver 53 illustrated in FIG. 3. In this figure, the information is initially received by an infrared phototransistor or light-receiving diode 54, here a TIL-414 Infrared Phototransistor by Radio Shack, connected to a 12-volt power source, indicated by the reference numeral 55. The phototransistor 54 is connected to a standard LM 311 optical amplifier 56 set up as a comparator by connection to the phototransistor 54 and a resistor 57 of 1000 ohms, a resistor 58 of 121 ohms, a resistor 59 of 4700 ohms and a 5-volt power source, indicated by the reference numeral 60.

In this setup, line 62 is the "read" line for the comparator and line 64 is the reference voltage line. When the photo diode 54 detects a light pulse from the fiber-optic cable 16, the diode 54 goes into the conducting mode and transmits about 0.4 volts. The comparator 56 reads the voltage via line 62 and triggers a 5-volt pulse from source 60.

Figure 4:
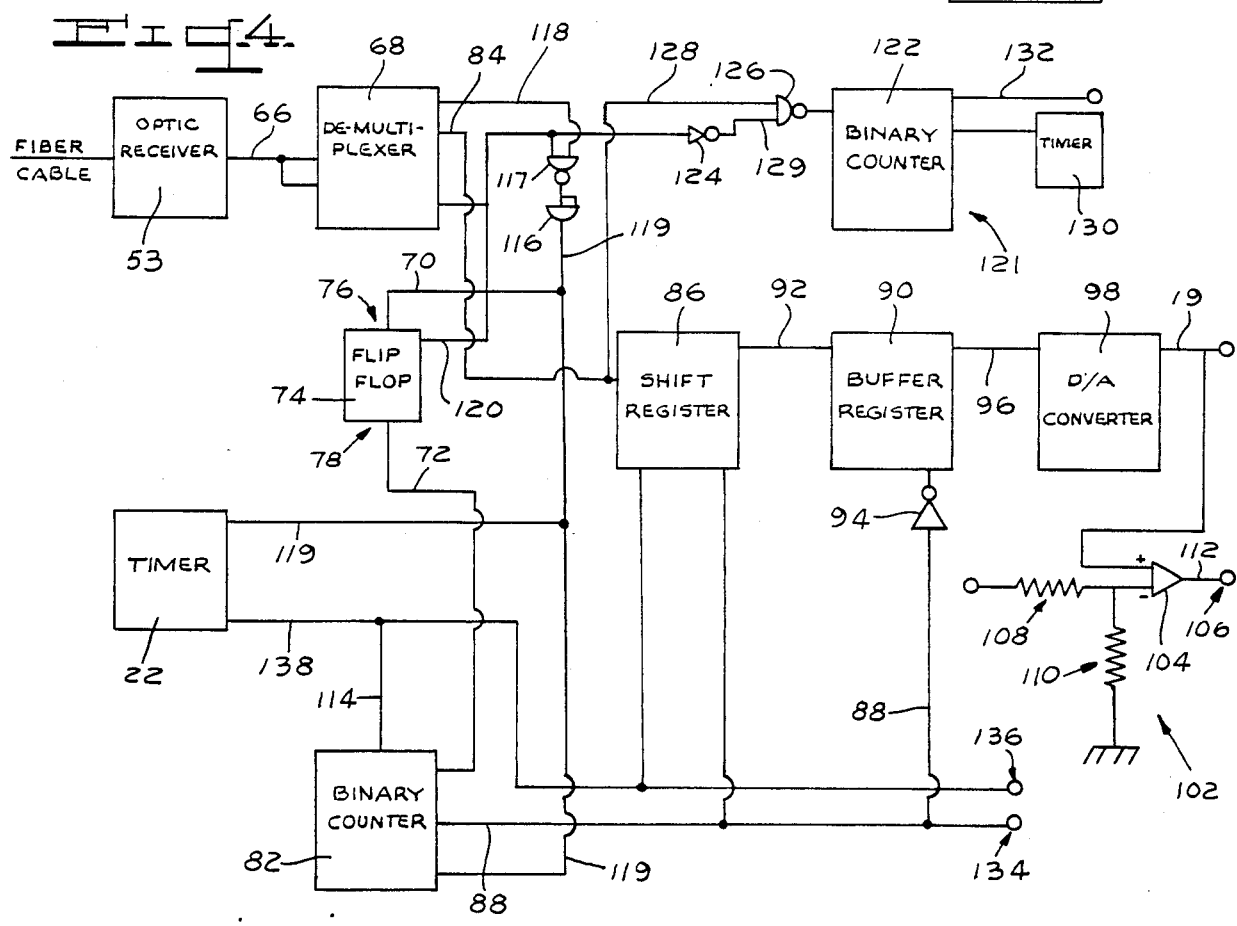
FIG. 4 is a block diagram of the receiving circuit.

The 5-volt pulse goes from output line 66 of the comparator 56 to a standard 74156 de-multiplexer 68 shown in FIG. 4. After a string of pulses, i.e., the analog data, is received by the de-multiplexer, the de-multiplexer separates the data.

Only two of the de-multiplexer's lines are used, those which correspond respectively to binary readings of 00 and 11. The "00" line (shown at 70 in the drawings) is designed to handle the "sync bit" while the "11" line (shown at 72) is used to handle the data.

The "00" and "11" lines are controlled by the output of a standard 7476 J-K flip flop 74, which selects the line to be used. When a low is applied to the "clear" input of the flip flop at 76, the flip flop selects the "11" line—the data line 70. On the other hand, when a low is applied to the "preset" input of the flip flop at 78, the "00" line is selected—the "sync bit" line 72.

If the sync bit line is selected, the chips which are then affected are the timer 22, shown in FIGS. 2 & 4, and a standard 74163 four-bit binary counter 82 shown in FIG. 4. The sync signal prepares the receiving circuit 18 for receiving a new string of information.

On the next clock pulse, the information present in output line 66 of the comparator 56 is passed via data line 84 to a standard 74199 eight-bit shift register. At the same time that the data is being entered, the counter 82 is counting the bits of information being accepted. Upon counting the eighth bit, the counter 82 signals the shift register 86 via line 88 (called the "most significant bit" line) to hold the data which has been loaded into the register. At this point, the data is transferred to a standard 74244 eight-bit buffer register 90 via data line 92. The buffer register 90 is enabled or triggered to accept the information from the register by an inverted signal from the most significant bit line 88, caused by a passing of the line 88 signal through a standard 7406 HEX-Inverter 94.

From the buffer register 90, the information is passed via data line 96 to a digital-to-analog converter 98 (here, Precision Monolithics, Inc.'s DAC-03 BDX2 D/A converter) for reconverting the signal to an analog output. This output is then transmitted along line 19 to the microprocessor.

The output may also be run to a warning system 102, such as that shown by a standard LM 741 amplifier 104 set up as a comparator via attachment to a 5-volt power source 106 and two resistors 108, 110 arranged to provide a reference voltage. When the comparator reads a voltage from output 100 that exceeds a preselected value, a signal is transferred along line 112 to a warning device such as an alarm or electrical readout device (not shown).

While the data is transferred to the buffer register 90, the counter 82 is still in operation counting the clock pulses. When the sixteenth pulse occurs, the output line 114 of the counter 82 is brought "high". This line is used to set the J-K flip flop 74 to a "high" output which sets the circuit for the next sync bit.

In addition to the elements previously disclosed, the receiver circuit 18 includes a built-in reset characteristic which allows the system to be turned on at any time regardless of the state of the incoming information. A standard 7408 quad AND gate 116 and a standard 7400 quad NAND gate 117 are hooked up together and communicate with a sync line 118 of the de-multiplexer 68, an "enabler" line 120 of the flip flop 74 and a reset line 119 attached to the counter 82 and the timer 22. The result is that the sync line 118 signal is inverted and the output (along line 119) of the AND gate 116 is "high" when the sync line 118 is "low". This "low", which occurs when the flip flop is "high" and the sync 118 is also "high" will reset the timer 22 and binary counter 82 via line 119 and will clear the flip flop 74.

In the preferred embodiment, the receiver circuit 18 also includes a line-lost warning system generally indicated at 121. This warning system is comprised of a second, standard 74163 four-bit binary counter 122 which is attached to the enabler line 120 from the flip flop 74 and a standard 7406 HEX-Inverter 124 and a standard 7408 quad AND gate 126. One input line 128 of the AND gate 126 is attached to data line 84, while the other input line 129 is connected to the enabler line 120 and the inverter 124.

This second binary counter 122 will detect a failure of the transmission circuit. If the transmission fails, there will be no reset of the counter via flip flop 74. In that event, the standard 555 timer 130, attached to the binary counter 122 will continue to clock the counter. The output line 132 will thus be "high" on every sixteenth clock pulse. By monitoring the status of the line in relation to the clock pulses, by means of a flip-flop network (not shown), it will be easy to detect a failure due to the absence of a reset (sync) pulse.

The preferred embodiment also includes a pair of openended leads at 134, 136 for hook-up of optional equipment such as read-out devices (not shown). The lead 134 is for hook-up to the "most significant bit" line 88, while the lead 136 is for hook-up to an output line 138 from timer 22.

While a single embodiment of the present invention has been expressly disclosed, it should be understood that obvious structural modifications can be made without departing from the spirit of the invention. For example, the chips presently used in the system are of the 74 series because they are economical. However, these chips do not meet the military temperature range. Therefore, if the military temperature range is desired, the 54 series chips may be used.

Accordingly, reference should be made primarily to the accompanying claims, rather than to the specification, to determine the scope of the invention.

Having thus described the invention, what is claimed is:

1. A device for transmitting analog sensor data via fiber optics, said device comprising:
   (a) a transmission circuit for receiving electrical analog data from a sensor, converting the data into bits of binary information, and transforming the information into light pulses for subsequent transmittal to a receiver circuit, said transmission circuit including an analog-to-digital converter for receiving analog data and converting it into binary information, a shift register connected to the converter for receiving a string of binary information and shifting the information to a light-emitting diode where the information is transformed into light pulses;
   (b) a fiber-optic cable having one end attached to the transmission circuit for receiving the light pulses from the light-emitting diode and transmitting them to a receiver circuit;
   (c) a receiver circuit, attached to the opposite end of the fiber-optic cable, for receiving the light pulses and converting them back into an analog signal for subsequent transmission to a monitoring device, said receiver unit including a light-receiving diode attached to the fiber-optic cable for receiving the pulses transmitted by the cable, a de-multiplexer connected to the light-receiving diode for handling the data and sending the data to an attached shift register, and a digital-to-analog converter attached to the shift register for receiving a string of data from the shift register, converting the string into an analog signal, and transmitting it to a monitoring system; and,
   (d) means for allowing the light-emitting diode of the transmission circuit to be normally kept "off" when no monitoring information is desired by a user, and to be turned "on" only when a new string of monitoring information is desired, said means including a self-resetting means for automatically clearing the receiver circuit after the light-emitting diode is turned "on" so that the string of sensor information transmitted by the receiving circuit to the monitor only includes the new information desired by the user and does not include any stale information previously stored by the device.

2. The device of claim 1 wherein the resetting means includes a timer, a binary counter attached to the timer for counting pulses from the timer, a flip flop connected to the counter which has an enabler output line that goes "high" in response to a signal from the counter, and an AND gate and a NAND gate which are hooked up together and which communicate with a sync line of the de-multiplexer, the enabler line of the flip flop and a reset line attached to the counter and the timer.

3. The device of claim 1 wherein the receiver circuit further includes a means to signal the shift register to unload a preselected number of binary bits of information to the de-multiplexer, said signaling means including a timer for emitting clock pulses, and a counter attached to the timer.

4. The device of claim 1 wherein the transmission circuit includes a means for automatically clearing the transmission circuit after the light-emitting diode is turned "on" so that the next transmission of binary information from the transmission circuit to the receiver circuit always starts with the first bit of a new byte of binary information whenever the diode is turned "on", and does not send an incomplete, stale byte whose transmission may have been stopped in the middle of the byte when the diode was last turned "off".

5. The device of claim 4 wherein the transmission clearing means includes a timer for signaling clock cycles, a binary counter attached to the timer for counting the clock cycles, a single flip flop attached to both an output line of the counter and a "start convert" line of the analog-to-digital converter, a double flip flop which is connected to both an output line of the timer and an "end convert" line of the converter, whereby a first signal from the end convert line activates one flip flop of the double flip flop and causes it to clear the second flip flop of the double flip flop so that the second flip flop acts as a buffer to keep a data output line of the transmission circuit clear until the next transmission of a full string of binary information is activated by a second signal from the end convert line to the double flip flop, wherein the second "end convert" signal is initiated by a signal to the analog-to-digital converter from the single flip flop in response to a signal to the single flip flop from the counter.

6. A method of transmitting electrical analog data in binary form to a microprocessor via an electro-optical transmission line, said method comprising:
(a) keeping a light-emitting diode of the electro-optical transmission line normally "off" until data it is desired by a user;
(b) turning the diode "on" when information is desired;
(c) converting the analog data to electrical bits of binary information via an analog-to-digital converter in the electro-optical line;
(d) transforming the information to light pulses via the light-emitting diode;
(e) transmitting the light pulses via a fiber-optic cable to a receiver circuit;
(f) receiving the light pulses in the receiver circuit and converting them back into an electrical analog signal for subsequent transmission to the microprocessor; and,
(g) initially clearing the receiver circuit after the diode is turned "on" so that the only information that will be transmitted by the receiver circuit to the microprocessor is new data obtained after the diode is turned "on" and does not include any stale data that may have been previously stored in the receiver circuit.

7. A device for transmitting analog data via fiber optics, said device comprising:
(a) a transmission circuit for receiving electrical analog data, converting the data into bits of binary information, and transforming the information into light pulses for subsequent transmittal to a receiver circuit, said transmission circuit including an analog-to-digital converter for receiving analog data and converting it into binary information, a shift register connected to the converter for receiving a string of binary information and shifting the information to a light-emitting diode where the information is transformed into light pulses;
(b) a fiber-optic cable having one end attached to the transmission circuit for receiving the light pulses from the light-emitting diode and transmitting them to a receiver circuit;
(c) a receiver circuit, attached to the opposite end of the fiber-optic cable, for receiving the light pulses and converting them back into an analog signal for subsequent transmission to an outside device, said receivr unit including a light-receiving diode attached to the fiber-optic cable for receiving the pulses transmitted by the cable, a de-multiplexer connected to the light-receiving diode for handling the data and sending the data to an attached shift register, and a digital-to-analog converter attached to the shift register for receiving a string of data from the shift register, converting the string into an analog signal, and transmitting it to the outside device; and,
(d) means for allowing the light-emitting diode of the transmission circuit to be normally kept "off" when no information is desired by a user, and to be turned "on" only when a new string of information is desired, said means including a self-resetting means for automatically clearing the receiver circuit after the light-emitting diode is turned "on" so that the next string of information transmitted by the receiving circuit to the outside device only includes the new information desired by the user and does not include any stale information previously stored by the receiver circuit.

* * * * *